_United States Patent Office_

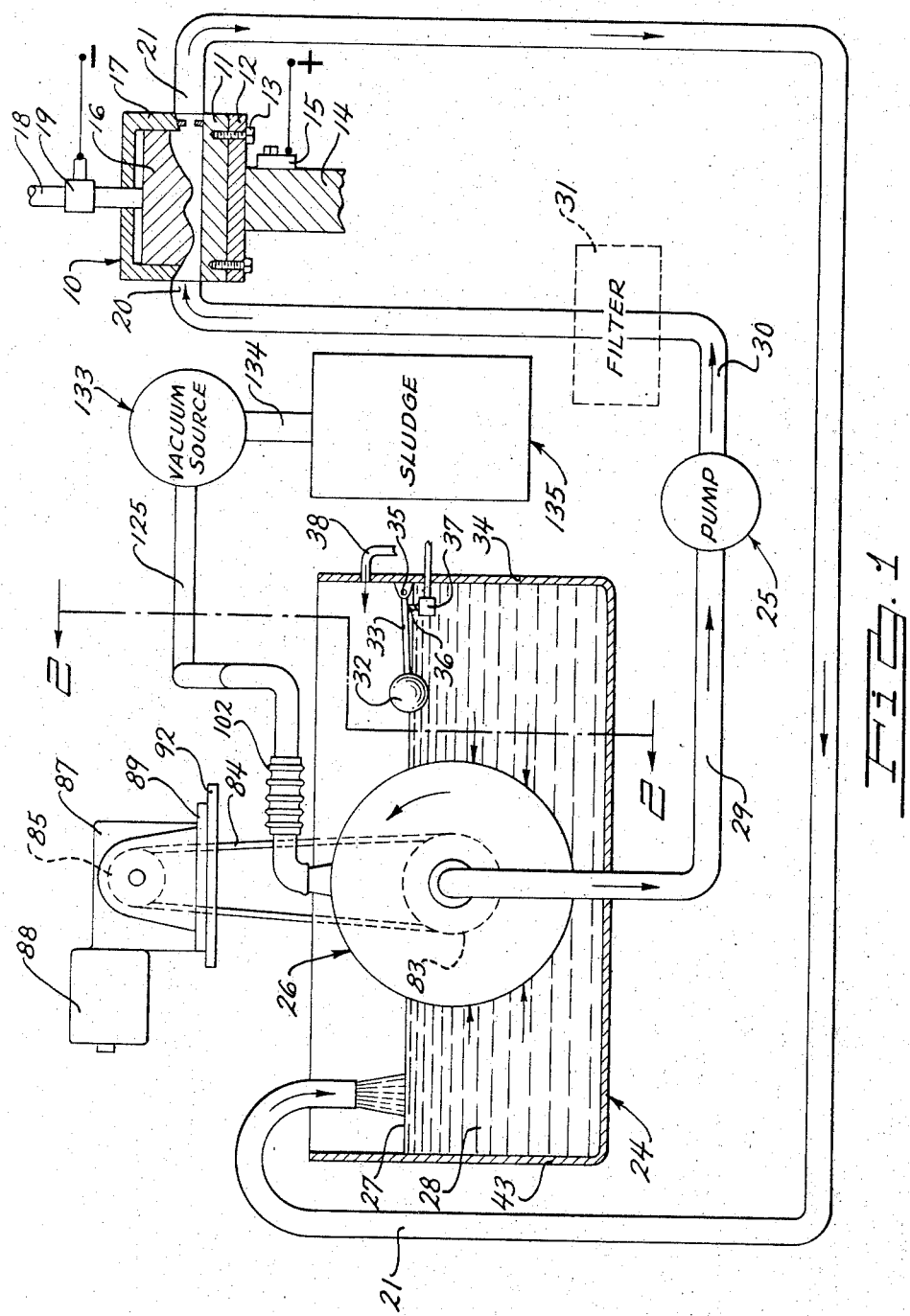

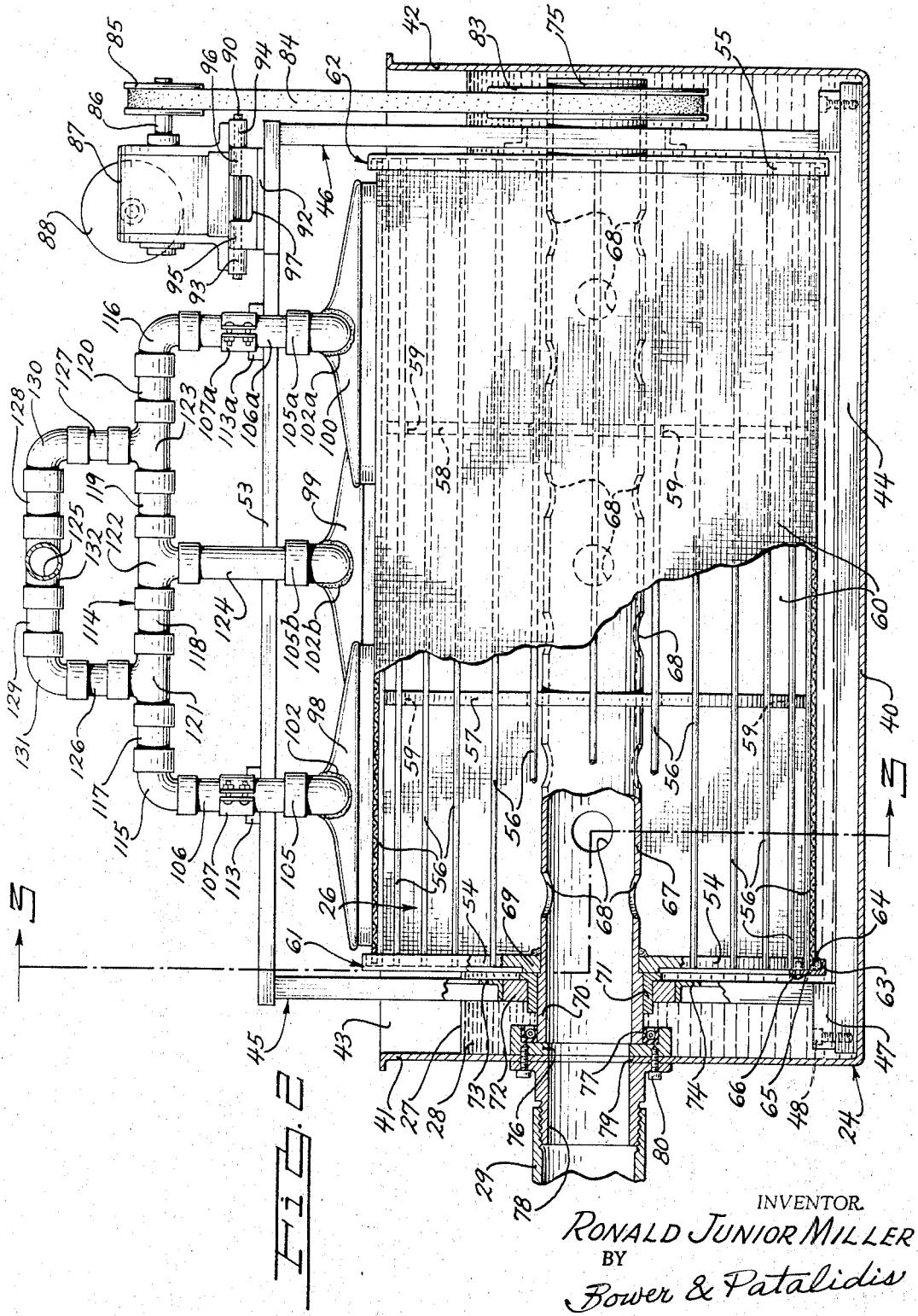

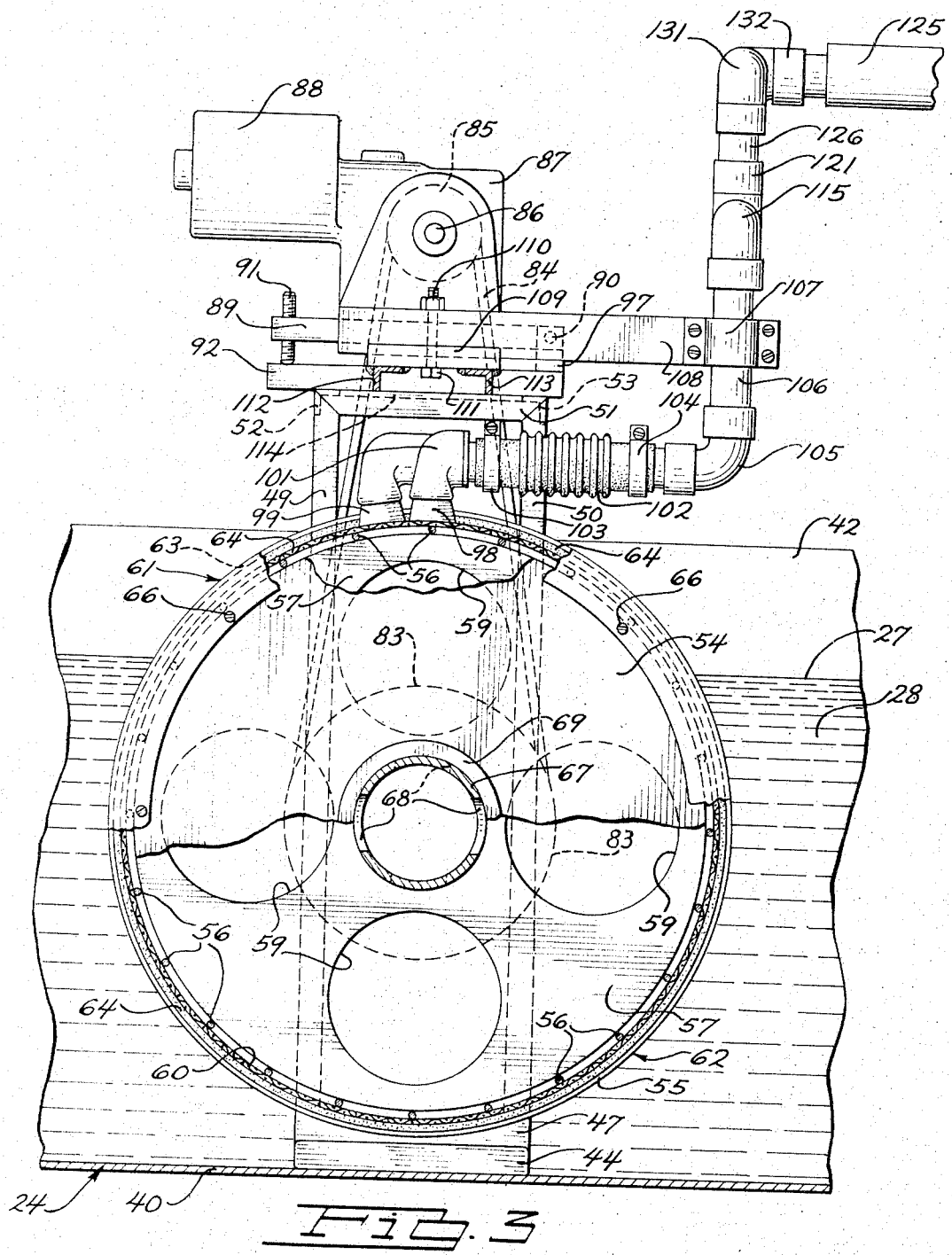

3,347,379
Patented Oct. 17, 1967

3,347,379
FILTRATION APPARATUS
Ronald Junior Miller, Lima, Ohio, assignor to Ex-Cell-O Corporation, Detroit, Mich., a corporation of Michigan
Filed Apr. 12, 1965, Ser. No. 447,500
2 Claims. (Cl. 210—127)

ABSTRACT OF THE DISCLOSURE

A filter apparatus having a rotary filter element mounted in a tank, and suction means to remove the adhering filtered material from the surface of the filter element while the liquid passes through.

---

This invention relates generally to filter apparatus, and, more particularly, to a novel filtration apparatus and method for removing insoluble solid articles contained in a liquid.

A filtration apparatus for removing suspended foreign material, as insoluble solids, from a liquid is required for many purposes, as for example, filtering coolants for machining operations, filtering the electrolyte for electro-chemical machining operations, filtering water from paint spray booths, and filtering quench oil in heat-treat operations. In most of the aforementioned filtering operations, the liquid filtration apparatus must process large quantities of liquid. In order to maintain a constant supply of filtrate, it is necessary that the filtration apparatus run for long periods of time without the need for shutting the apparatus down for cleaning the filter medium used in the filtration apparatus. For example, in electro-chemical machining operations, it is desirable to maintain a constant supply of filtered electrolyte to prevent the electrolyte from being overloaded with precipitates of metal dissolved from the anode workpiece, and to ensure continuous operation of the machine. The prior art type filtration apparatus must be shut down for filter changing or cleaning operations and cannot provide a continuous supply of filtrate from an individual filtration apparatus. In the past it has been necessary to have a plurality of filtration units to provide at least one working unit when the others are shut down to permit servicing of the filter medium.

In view of the foregoing, it is an important object of the present invention to provide a novel and improved filtration apparatus which is adapted to remove suspended insoluble solid particles from a liquid and to operate continuously to supply large quantities of filtered liquid for use with machines and other devices which require a constant supply of large quantities of filtered liquid for continuous operation.

It is another object of the present invention to provide a novel and improved filtration apparatus which includes means adapted to continuously clean the surface of the filter medium employed in the filtration apparatus so that the suspended solid particles in the liquid are removed from the filtration apparatus.

It is a further object of the present invention to provide a novel and improved filtration apparatus which is continuously self cleaning, whereby it may be operated over extended periods of time without requiring any loss of operating time for cleaning the filter medium employed in the filtration apparatus.

It is another object of the present invention to provide a filtration apparatus having a continuous filter medium and means for removing the filtered foreign matter from the filtration apparatus so as to permit continuous operation to provide a constant filtering rate of flow of the filtrate back to the point or points of use of the filtrate.

It is still another object of the present invention to provide a novel filtration apparatus which is adapted to increase the efficiency of industrial and other large volume filtering operations with accompanying decrease in the cost of the filtering operations.

It is still a further object of the present invention to provide a novel and improved filtration apparatus which includes, a container adapted to receive a contaminated liquid for filtering, a partially submerged rotary filtering medium operatively mounted in said container, means for evacuating the liquid in the container through the filtering medium, and means for removing the filtered foreign matter adhering to the exposed surface of the rotary filtering medium while it is rotating.

It is still another object of the present invention to provide a novel and improved filtration apparatus which is simple and compact in construction, economical of manufacture, and efficient in operation.

It is still another object of the present invention to provide a novel and improved process for removing suspended insoluble solid particles from a liquid.

It is still a further object of the present invention to provide a novel and improved process for removing insoluble solid particles which are in suspension in a liquid comprising the steps of conducting the liquid into a container in which is disposed a partially submerged rotary filter medium, evacuating the liquid in the container through the filter medium, and, removing the solid particles adhering to the exposed surface of the rotary filter medium while it is rotating.

Other objects, features and advantages of this invention will be apparent from the following detailed description, appended claims, and the accompanying drawings.

In the drawings:

FIG. 1 is a schematic representation of a filtration apparatus made in accordance with the principles of the present invention, and showing the filtration apparatus applied to an electro-chemical machining operation;

FIG. 2 is a front elevational view of the filtration apparatus illustrated in FIG. 1, taken substantially along the line 2—2 thereof, with portions of the structure removed, and looking in the direction of the arrows; and FIG. 3 is a partial, elevational view of the structure illustrated in FIG. 2, with parts removed and parts in section, taken substantially along the line 3—3 thereof, and looking in the direction of the arrows.

The filtration apparatus of the present invention has been illustrated in FIG. 1 in a schematic manner in an arrangement to provide a constant supply of filtrate to an electro-chemical machining apparatus. The electro-chemical machining apparatus is generally designated by the numeral 10 and it illustrates a typical die-sinking operation. The anode block, or workpiece, is designated by the numeral 11 and it is secured to a conductive supporting plate 12 by any suitable means, as by the screws 13. The plate 12 is fixed to a conductive supporting member 14 which is connected to the anode bus bar 15. A cathode tool 16 is operatively mounted in a guide box 17 which is attached to the workpiece 11. The cathode tool 16 is connected by a support member 18 to a cathode bus bar 19. The electrolyte is supplied to the electro-chemical machining apparatus by the inlet tubing 20 and it is exhausted by the outlet tubing 21.

As shown in FIG. 1, a supply of filtered electrolyte is taken from the container or reservoir 24 and is supplied to the electro-chemical machining apparatus 10 under pressure by means of the suction pump 25. The suction pump 25 evacuates the electrolyte 28 from the container or tank 24 through the rotary filtering medium, generally indicated by the numeral 26, at a point below the level 27 of the electrolyte in the container 24. The electrolyte 28 is conducted through the conduit or pipe 29, to the pump 25, and thence into the supply conduit 30. The filtered electrolyte or filtrate is then forced through a secondary filter 31, if desired, and into the inlet tubing 30. The used electrolyte flows back to the container 24 through the exhaust or return tubing or conduit 21.

It is important to maintain the level of the electrolyte or other liquid to be filtered in the container 24 to a level 27 above the intake of the conduit 29. The volume of liquid in the circuit may decrease due to leakage and other losses, and accordingly, a make-up supply of fresh liquid may be provided from a suitable auxiliary reservoir. As shown in FIG. 1, the container 24 is provided with a liquid make-up supply line 38 for supplying additional liquid to the container to maintain the level 27 above the intake of the conduit 29. The flow of make-up liquid through the conduit 38 may be controlled by any suitable means. In FIG. 1, a float operated switch means has been schematically illustrated for this purpose. The numeral 32 indicates a float member carried on the arm 33 which is connected pivotally to the end wall 34 of the container 24 at the point indicated by the numeral 35. A switch operating member 36 is carried by the float arm 33 and is adapted to actuate a suitable switch means 37 for operating the electrical control of a suitable make-up liquid supply valve, or the like.

As shown in FIGS. 1, 2 and 3, the container 24 comprises a tank made from any suitable material and comprising a bottom wall 40, side walls 41 and 42, and end walls 43 and 34. The rotary filtering medium 26 is rotatably mounted in the container 24 on a suitable supporting means comprising a frame made from a purality of angle irons and the like.

As shown in FIGS. 2 and 3, the supporting means includes a restangular base plate 44, made from any suitable material, on which is fixed a pair of spaced apart uprights or vertical frame members, generally indicated by the numerals 45 and 46. The uprights 45 and 46 are similarly formed and the upright 45 is shown in detail in FIGS. 2 and 3. The upright 45 includes the transverse plate 47 which is secured by any suitable means to the plate 44, as by the screws 48, shown in FIG. 2. A pair of spaced apart vertically disposed angle iron bars 49 and 50 are fixed to the plate 47 by any suitable means, as by welding. The upper ends of the angle iron bars 49 and 50 are fixed together by the transverse angle iron bar 51. The upper ends of the support frame uprights 45 and 46 are connected by a pair of spaced apart angle iron bars 52 and 53. The angle iron bars 52 and 53 may be connected to the frame uprights 45 and 46 by any suitable means as by welding or by screws.

As shown in FIGS. 2 and 3, the rotary filtering medium or member comprises a pair of spaced apart, vertical, circular end plates or flanges 54 and 55 which are connected by a plurality of interconnecting longitudinally disposed rods 56. The rods 56 are fixed to the end plates 54 and 55 by any suitable means, as by welding. The rods 56 are disposed around the peripheries of the circular plates 54 and 55, but they do not extend beyond the peripheral edges of these plates. The rods 56 are supported between the end plates 54 and 55 by a pair of spaced, fixedly connected circular plates 57 and 58, as shown in FIG. 2. As shown in FIG. 3, the plate 57 is provided with a plurality of radially disposed openings 59. The plate 58 would be provided with similar openings.

The filtering medium 26 further includes a suitable filtering fabric or element 60 which is wound around the cylindrical supporting means formed by the rods 56 and the plates 54, 55, 57 and 58. The filtering element 60 is retained on the aforedescribed cylindrical supporting means by a pair of annular retainer members generally indicated by the numerals 61 and 62. These annular retainer members are similar in construction and only the members 61 has been shown in detail. As shown in FIG. 2, the annular retainer member 61 includes the longitudinal flange 63 which engages the outer surface of the one end of the filtering element 60 and holds this end of the filtering element against the rods 56. As shown in FIG. 2, a suitable annular sealing member 64 is mounted between the flange 63 and the end of the filtering element 60. The annular retainer member 61 further includes the integral transverse flange 65 which engages the outer face of the cylindrical end plate 54 and which is secured thereto by any suitable means, as by a plurality of screws 66.

The rotary filtering medium 26 is rotated by the following described structure. As shown in FIGS. 2 and 3, the filtering medium 26 is provided with an axially disposed horizontal tubular supporting shaft 67 which is provided with a plurality of openings 68, so as to provide a perforate pipe. As shown in FIG. 2, the tubular shaft 67 is connected to the pump intake conduit 29 by the following described structure. A circular supporting plate 69 is welded to the tubular shaft 67 and the plate 69 is in turn fixedly secured, as by welding, to the cylindrical end wall or flange 54. The outer end of the shaft 67 is enlarged and is adapted to form a journal 70 which is rotatably mounted in the sleeve bearing 71. The sleeve bearing 71 has an inner shoulder which rests against the supporting plate 69. The bearing 71 is mounted in the circular supporting ring 72. The supporting ring 72 is supported by a pair of spaced apart transverse angle iron bars 73 and 74 which are fixed to the frame upright members 49 and 50. The other end of the tubular shaft 67 is similarly supported by the frame upright 46. However, the other end of the tubular shaft 67 is enclosed by a suitable closure member 75 as shown in FIG. 2.

As shown in FIG. 2, the outer end of the shaft journal 70 operatively engages an end-thrust bearing member 76. A suitable seal member 77 is mounted between an inwardly extended flange on the bearing member 76 and the shaft journal 70. A pipe fitting 78 is connected over an opening 79 in the tank wall 41 for communicating the tubular shaft 67 with the conduit 29. The conduit 29 is threadably mounted on the outer end of the pipe fitting 78. The fitting 78 is fixed to the tank wall 41 by any suitable means, as by a plurality of screws 80. It will be seen that a continuous passage is provided through the bearings 76, the tank wall 41, and the fitting 78 to connect the inside of the filtering medium 26 to the conduit 29. It will be seen that the filtering medium 26 provides a vacuum chamber in the tank or container 24 into which the liquid 28 in the container will flow when the liquid inside of the filtering medium has been withdrawn by the pump 25.

The rotary filtering medium or member 26 is rotated by the following structure. A suitable pulley 83 is fixed on the closed end of the tubular shaft 67 as shown in FIG. 2. The pulley 83 is driven by a belt 84 which is driven by a pulley 85. The pulley 85 is fixed on an output shaft 86 of a suitable gear reducer 87. The gear reducer 87 is operatively connected to an electric drive motor 88. The electric drive motor 88 is supported on the housing of the gear reducer 87. As shown in FIG. 3, the gear reducer 87 is mounted on a plate 89 which is hingedly supported at one end therof by the shaft 90. The other end of plate 89 is supported by an adjustable screw 91 which is threaded through the plate 89 and has its lower end in abutment with a support plate 92. The support plate 92 is seated on the longitudinal angle iron bars 52 and 53 and is connected thereto by any suitable means as by welding. As shown in FIG. 2, the plate 89 is provided with a pair of spaced apart hinge members 93 and 94 which are disposed on the outer sides of a pair of mating hinge members 95 and 96 carried on a bar 97 which is fixed to the support plate 92. The hinge shaft 90 is operatively mounted through the hinge members 93, 94, 95 and 96 so as to pivotally support the motor 88 and gear reducer 87 relative to the support plate 92. It will be seen that by threading the screw 91 in the proper direction, the gear reducer 87 may be rotated in a clockwise direction, as viewed in FIG. 3, for taking up the slack in the belt 84. The last mentioned structure provides a belt tightening means.

The filtering apparatus of the present invention is provided with a means for removing the solid particles or foreign matter which adheres to the exposed surface of the partly submerged rotary filtering medium 26 while it is rotating. As shown in FIG. 2, a plurality of suction heads 98, 99 and 100 are disposed so as to cover a line extended axially of the filter element 60. The vacuum heads 98 and 99 are disposed at the ends of the filter element 60, in axial alignment with each other, and the suction element 99 is disposed in an overlapping position adjacent the suction members 98, 99 and 100 to close the gap between these last two members. The suction head members 98, 99 and 100 are shaped like vacuum sweeper suction members and are maintained in a position adjacent the surface of the filter element 60.

As shown in FIG. 3, the suction head 98 is connected to an elbow 101 which in turn is connected to a bellows 102 by the hose connector 103. The bellows 102 is connected by the hose connection 104 to an elbow 105 which in turn is connected to a pipe 106. The pipe 106 is connected by a pipe bracket means 107 to a support arm 108. The support arm 108 is fixed by a bolt 111 and a nut 110 to the support plate 109. The support plate 109 is fixed to a pair of angle bars 112 and 113 which are supported by a suitable plate 114 interconnected between the longitudinal angle bars 52 and 53. The suction head 100 is supported by a similar structure and its corresponding parts have been marked with the same reference numerals followed by the small letter "a". The suction heads 98 and 100 are interconnected by an axially disposed conduit 114 which is formed by the elbows 115 and 116, the nipples 117, 118, 119 and 120, and the T-pipe fittings 121, 122 and 123.

The T-fitting 122 is connected by the pipe 124 to the elbow 105b of the suction head 99. The T-fittings 121 and 122 are connected to the suction conduit 125 by the nipples 126, 127, 128 and 129, the elbows 130 and 131 and the T-fitting 132. As shown in FIG. 1, the vacuum conduit 125 is connected to a suitable vacuum source, as for example, a suitable vacuum pump 133. The vacuum source 133 discharges solid particles, and other foreign matter picked up from the surface of the rotary filtering medium 26 and discharges it through the conduit 134 into a suitable sludge tank 135.

A suitable vacuum source 133 is an industrial vacuum cleaner available on the market under the trade name "Tornado" and which is sold by the Brewer Electric Manufacturing Company of Chicago, Illinois.

In use, the filtration apparatus of the present invention would be connected to the machine to be serviced in a maner as shown in FIG. 1. The level of the liquid 28 must be maintained as indicated by the numeral 27 so that the pump 25 will be provided with a constant supply of liquid 28 from the inside of filtering medium 26, a vacuum is provided inside of the filtering medium 26 and the liquid 28 in the tank 24 will flow into the rotating filtering medium 26 and in turn be evacuated by the pump 25. The apparatus of the present invention provides a constant rate of supply of the filtrate, and because of the continuous removal of the foreign matter from the surface of the exposed portion of the rotating filtering medium 26, the apparatus may be operated continuously.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:
1. A filtration apparatus comprising:
(a) a container adapted to receive a contaminated liquid for filtering;
(b) means for maintaining said liquid at a substantially constant level in said container;
(c) supporting means disposed in said container;
(d) a perforate pipe having an open end and a closed end disposed below the level of said liquid and mounted on said supporting means; the perforations in said pipe defining an inlet means and the outlet means defined as the open end of said pipe;
(e) a rotary filtering means mounted on said perforate pipe for rotation about a substantially horizontal axis;
(f) means for rotating said filtering means;
(g) said rotary filtering means being partially submerged within said liquid and including a frame having imperforate end flanges and a liquid pervious filter element disposed about the periphery of the frame, said rotary filtering means adapted to filter said liquid as it is passed through said filter element into the interior of said frame;
(h) pump means having its intake in communication with said open end of said perforate pipe for evacuating said liquid from said container through said filter element; and
(i) suction means including a plurality of suction heads disposed in overlapping arrangement and engaging a portion of the periphery of said filter element above said level of said liquid for removing filtered material adhering to the surface of said filter element.

2. A filtration apparatus as defined in claim 1, further comprising:
(a) said supporting means including a base and a pair of spaced apart vertical frame members;
(b) each of said vertical frame members having a bore centrally aligned;
(c) a sleeve bearing mounted in each bore of said vertical frame members;
(d) said container including a bottom wall, a pair of said walls, and a pair of end walls;
(e) one of said side walls having a bore centrally aligned with the bores on said vertical frame members;
(f) a thrust bearing members mounted in said bore of one of said pair of side walls;
(g) pipe fitting means mounted on said one of said pair of side walls opposite to said thrust bearing member;
(h) said pipe fitting means adapted to provide connection for conduit means for evacuating said liquid from said container by said pump means;
(i) said perforate pipe disposed in said bores having said open end engaging said thrust bearing member; whereby said perforate pipe is adapted to be rotated and foreign matter adhering to the exposed surfaces of said rotary filtering means is adapted to be removed by said suction means as the liquid flows through said filtering element and exits through said perforations in said pipe and through said outer end to said conduit means.

References Cited

UNITED STATES PATENTS

| | | | |
|---|---|---|---|
| 1,914,742 | 6/1933 | Hillier | 210—77 |
| 2,614,134 | 10/1952 | Powers | 210—67 X |
| 2,998,883 | 9/1961 | Rich | 210—404 |
| 3,245,536 | 4/1966 | McKay | 210—77 |

SAMIH N. ZAHARNA, *Primary Examiner.*